July 29, 1958 H. A. PURSCHE 2,845,014
TWO-WAY PLOW WITH UNIVERSAL TOOL HEAD
Filed Feb. 2, 1953 4 Sheets-Sheet 1
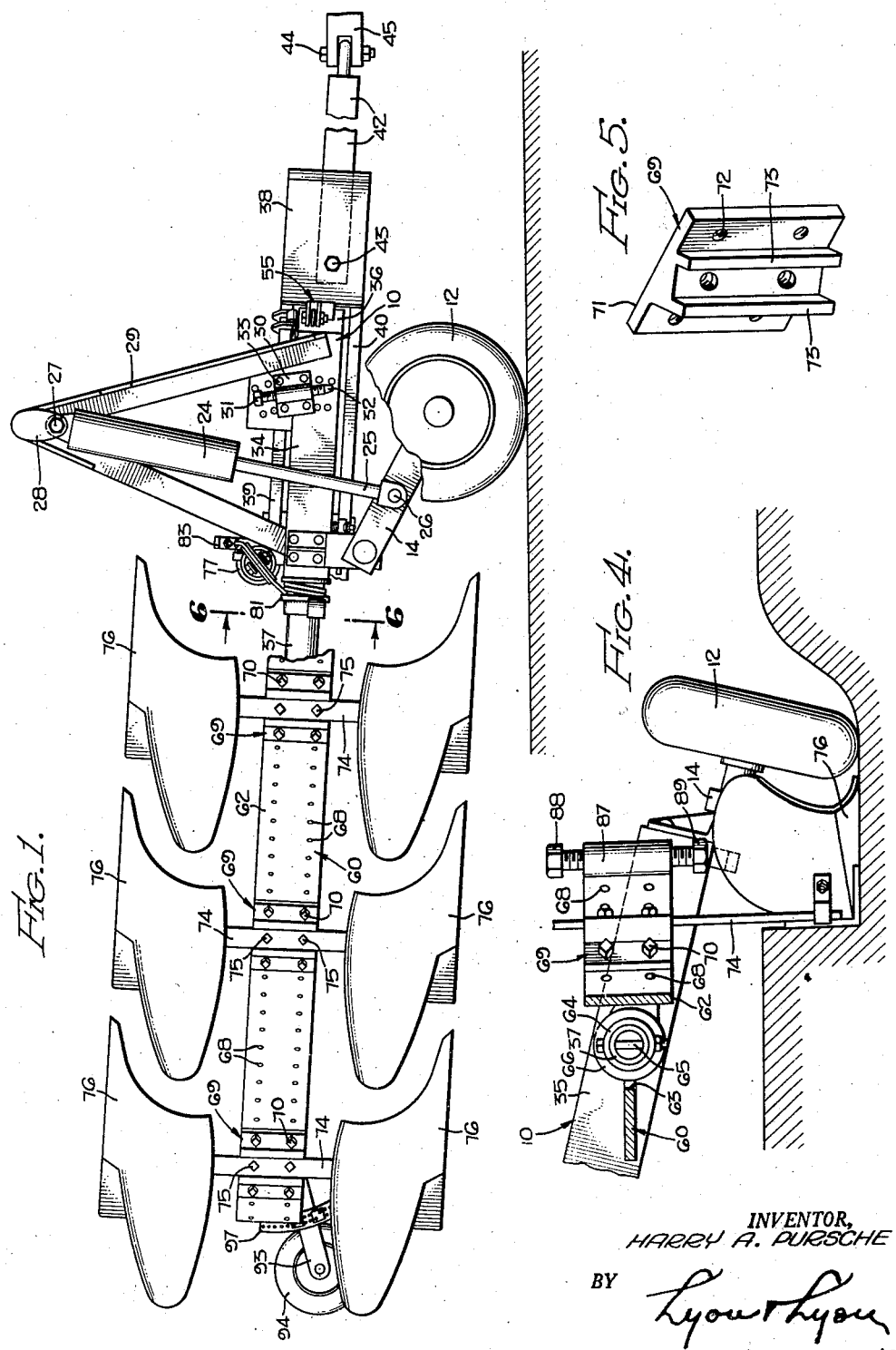
INVENTOR,
HARRY A. PURSCHE
BY
Lyon & Lyon
ATTORNEYS

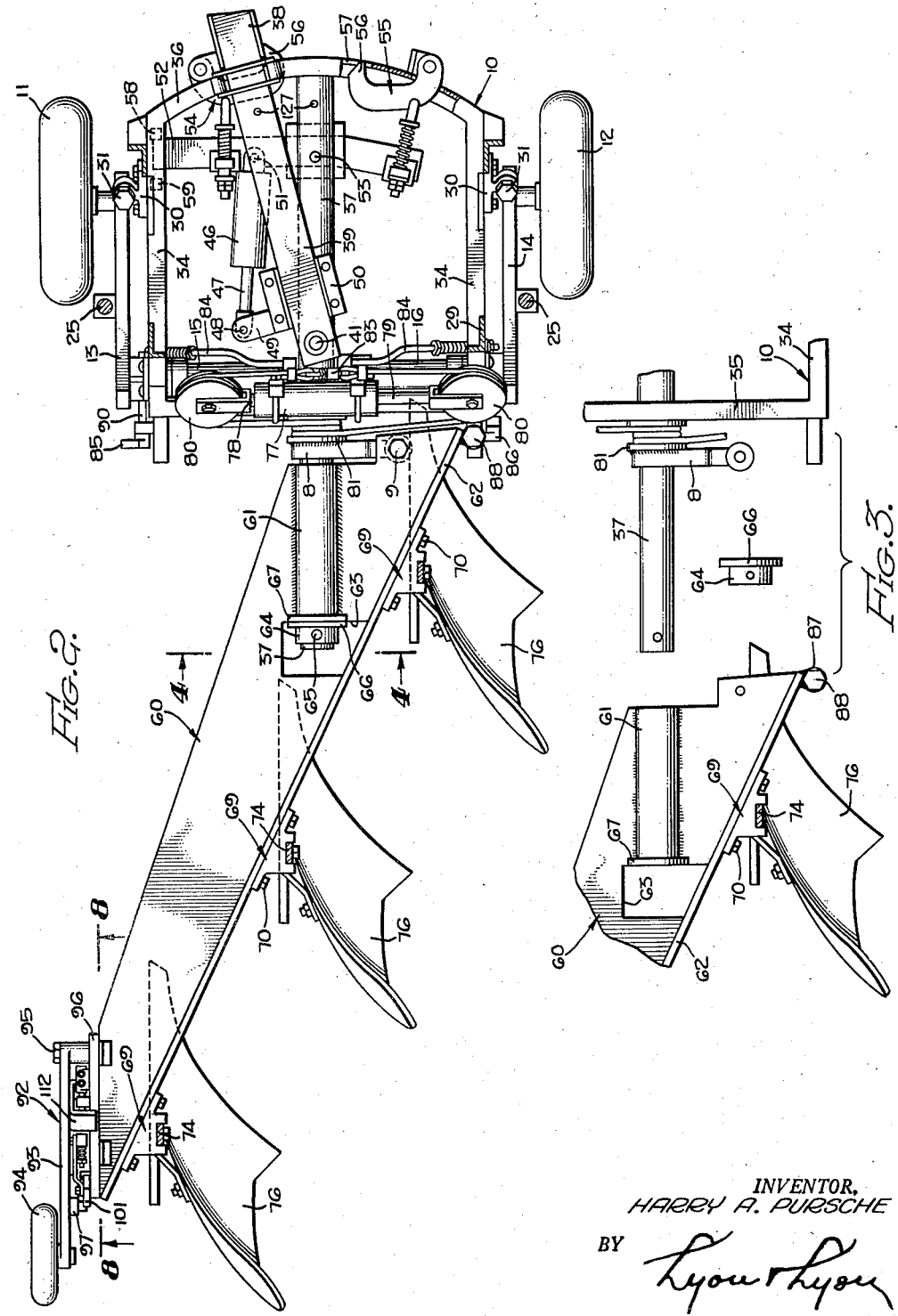

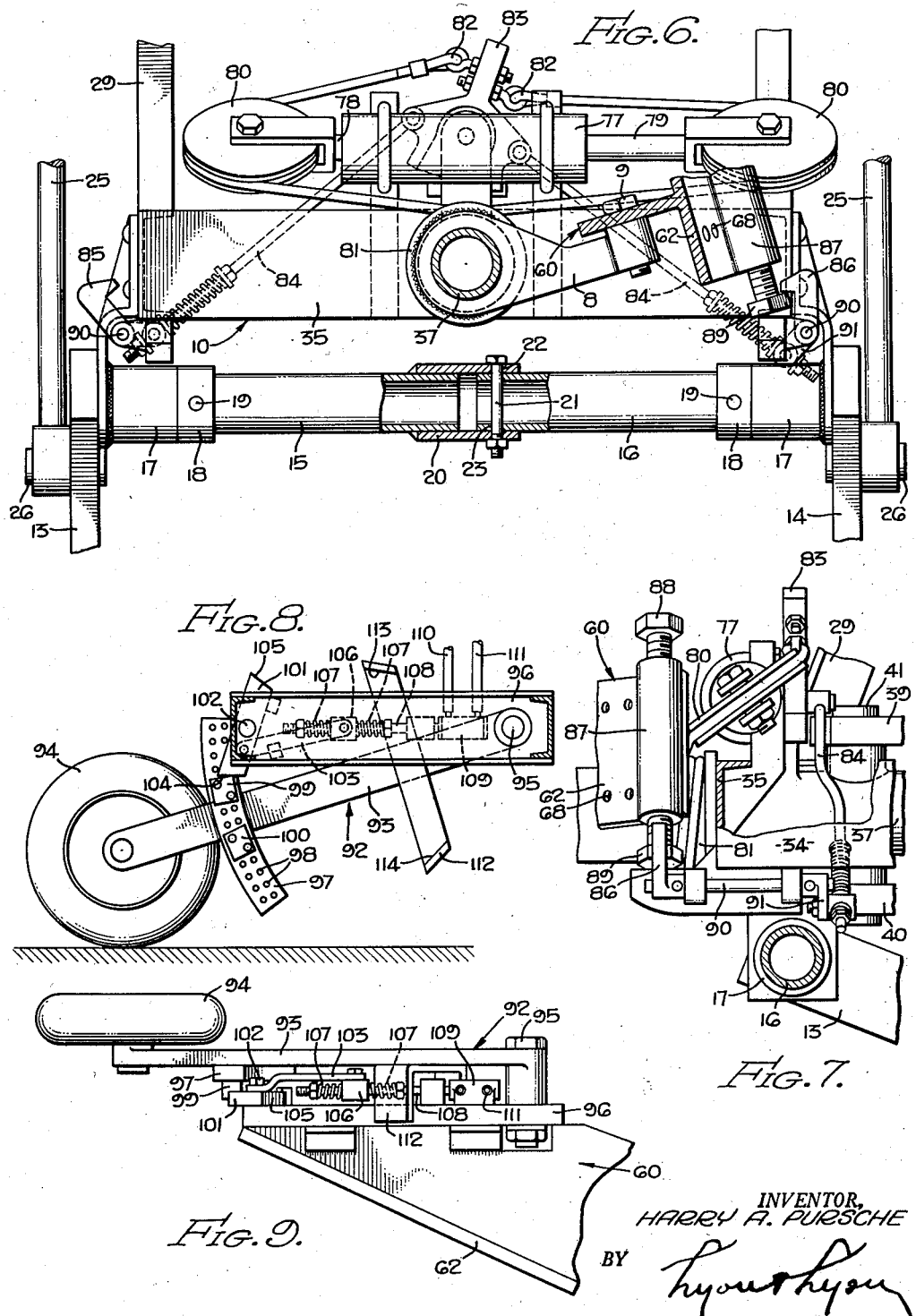

July 29, 1958 H. A. PURSCHE 2,845,014
TWO-WAY PLOW WITH UNIVERSAL TOOL HEAD
Filed Feb. 2, 1953 4 Sheets-Sheet 4

INVENTOR,
HARRY A. PURSCHE.
BY
ATTORNEYS

United States Patent Office 2,845,014
Patented July 29, 1958

2,845,014

TWO-WAY PLOW WITH UNIVERSAL TOOL HEAD

Harry A. Pursche, Gardena, Calif.

Application February 2, 1953, Serial No. 334,643

4 Claims. (Cl. 97—26)

This invention relates to agricultural implements and is particularly directed to improvements in a two-way plow having provision for mounting a universal tool head. Two-way plows of the general type described herein are shown in my prior Patents 2,625,089; 2,625,090; and 2,625,091, all dated January 13, 1953. The present application also relates to improvements over the Two-Way Roll-Over Disc Plow shown in my application Serial No. 318,051, filed October 31, 1952, now Patent No. 2,777,373.

A principal object of the present invention is to provide an improved form of two-way plow having means for supporting either disc plows or moldboard plows, as desired. Another object is to provide such a device which may be carried on a tractor or which may be supported on a wheeled carriage.

A more particular object is to provide a two-way plow having a carrier mounted to turn on a longitudinal beam, the carrier being provided with a continuous support extending at an angle to the beam and having a portion thereof positioned directly behind the rear end of the beam, together with means for mounting a plurality of disc plows or right and left hand moldboard plows at desired intervals along the support.

Another object is to provide a two-way plow of this type wherein one of several types of tool heads or carriers may be mounted on the rearwardly extending longitudinal beam, together with means whereby a connection may be readily effected to hold any one of these tool heads or carriers in position. Another object is to provide a detachable connection between the carrier and the power means for turning it on the longitudinal beam.

Other and more detailed objects and advantages will appear hereinafter.

Referring to the drawings:

Figure 1 is a side elevation showing a preferred embodiment of my invention.

Figure 2 is a plan view thereof.

Figure 3 is a schematic view, partly in section, showing the manner of assembly of the plow carrier and longitudinal beam.

Figure 4 is a transverse sectional view taken substantially on the lines 4—4 as shown in Figure 2, certain background parts being omitted for clarity of illustration.

Figure 5 is a perspective view showing one of the brackets employed for supporting the plow beams on the plow carrier.

Figure 6 is a rear elevation, partly broken away, taken substantially along the lines 6—6 as shown in Figure 1.

Figure 7 is a fragmental detail showing the latch mechanism for holding the plow carrier against movement relative to the plow frame.

Figure 8 is a side elevation of the tail wheel assembly taken substantially on the lines 8—8 as shown in Figure 2.

Figure 9 is a top plan view of the apparatus shown in Figure 8.

Figure 10:
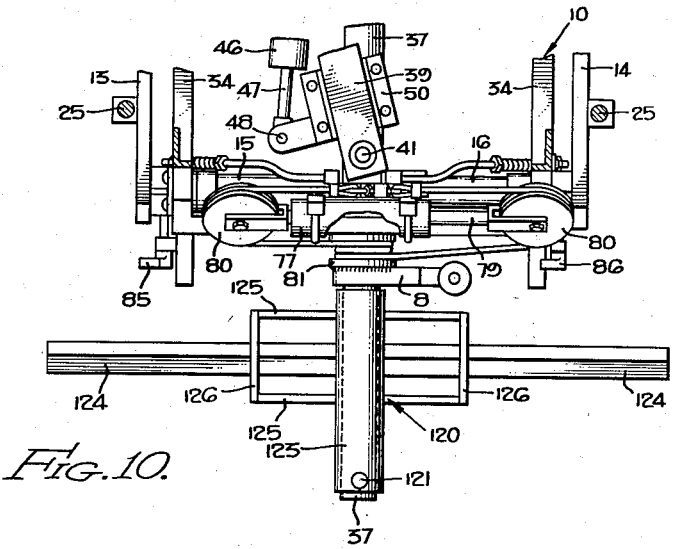
Figure 10 is a top plan view, partly broken away, showing a modified form of tool head in position on the longitudinal beam.

Referring to the drawings, a plow frame 10 may be supported on a tractor or, as shown in the drawings, may be independently supported on ground wheels 11 and 12. These wheels are carried at the forward swinging ends of arms 13 and 14, respectively, and these arms are fixed to tubular coaxial shafts 15 and 16, respectively. These shafts project through bearing sleeves 17 fixed on the frame 10 and are held in position by means of collars 18 provided with set screws 19. The shaft 15 is provided with a sleeve 20 fixed thereto and projecting axially to receive a portion of the shaft 16 in telescopic relation. A bolt 21 extends through aligned apertures 22 and 23 in the shafts and serves to cause the shafts to turn in unison. The bolt 21 may be withdrawn to permit the shafts 15 and 16 to have independent movement when desired. Power means are provided for raising and lowering the ground wheels 11 and 12 relative to the frame 10 and this power means may take the general form shown in my Patent 2,625,089, mentioned above. This power means includes a pair of hydraulic cylinder assemblies 24, each having a piston rod 25 pivotally connected at 26 to one of the wheel arms 13 or 14. One end of each hydraulic cylinder assembly is pivotally connected at 27 to an ear 28 fixed on an A-frame assembly 29 attached to the frame 10. Means are provided for limiting the extent of movement of the wheel arms in one direction and, as shown in the drawings, this means includes brackets 30 each provided with an adjusting screw 31 having a lower end 32 which engages a portion of the swinging end of the wheel arms. The brackets 30 may be fixed to the frame 10 at any one of a plurality of positions by means of the bolts 33. When the bolt 21 connects the wheel shafts 15 and 16 for dependent movement, the wheel arms 13 and 14 are actuated in unison, and when the bolt 21 is removed the wheel arms may have independent movement. The hydraulic connections, not shown, for the hydraulic cylinder assemblies 24 preferably connect these assemblies in parallel and supply hydraulic power from a pump located on the tractor, not shown.

The frame 10 preferably includes a pair of side members 34 connected at their rearward ends by means of a cross member 35 and connected at their forward ends by means of an arcuate member 36. The longitudinal beam 37 is fixed to the arcuate member 36 at its forward end and is also fixed to the cross member 35. This beam 37 projects rearwardly from the cross member 35 to provide means for mounting one of several types of tool heads, described below. A draft tongue 38 is bifurcated as shown in Figure 1 to form an upper portion 39 and a lower portion 40. The upper and lower portions are pivoted to the longitudinal beam 37 by means of the pivot pins 41. A draft link 42 is pivotally connected at 43 to the tongue 38 and is connected at its forward end to the draft pin 44 on the tractor drawbar 45.

Means are provided for swinging and latching the tongue 38 with respect to the frame 10 and this means preferably takes the form shown in my copending application Serial No. 318,051, filed October 31, 1952. As shown in the drawings, this means includes a hydraulic power cylinder 46 having its piston rod 47 connected at 48 to the arm 49 of bracket 50. This bracket 50 is connected to the upper portion 39 of the bifurcated tongue 38. One end of the hydraulic power cylinder 46 is pivotally connected at 51 to the latch operating bar 52. This bar is pivoted at 53 to the longitudinal beam 37 and is provided with means for operating the tongue latches 54 and 55. These latches are pivotally mounted on the arcuate member 36 of the frame and have latching parts 56 which project through apertures 57 in the member 36. When the transverse bar 52 is swung in one direction against the stop 58, the tongue latch 55 is retracted and the tongue latch 54 is advanced into operative position. When the bar 52 is swung in the other direction again the stop 59, the latch 54 is retracted and the latch 55 is advanced. From this description it will be understood that the hydraulic power cylinder assembly 46 serves both to swing the tongue 38 and to latch it in position.

In accordance with my invention, I provide a plow carrier 60 which includes a tubular section 61 shaped to receive the projecting portion of the longitudinal beam 37 in telescopic relation. The carrier 60 is provided with a continuous support or plate 62 which extends from the forward end of the carrier to the rearward end thereof, passing behind the rearward end of the longitudinal beam 37. An opening 63 is provided in this carrier 60 and the beam 37 projects into this opening. A thrust collar 64 is received on the end of the beam 37 and is held in place by means of a pin 65. The thrust collar 64 and carrier 61 are provided with thrust receiving flanges 66 and 67.

The plate 62 is provided with two series of apertures 68 and the spacing of these apertures is so related to the angularity of the plate 62 that movement of a bolt from one aperture to the next serves to move the bolt one inch, measured in a direction transverse to the axis of the longitudinal beam 37. Either disc plows or moldboard plows may be supported from the plate 62. In the drawings, I have shown brackets 69 which may be connected to the plate 62 by means of bolts 70. As shown in Figure 5, the brackets 69 are each provided with a substantially flat face 71 which rests against the plate 62 and are held in position by means of the bolts which pass through apertures 72 and 68. Each bracket 69 is provided with parallel walls 73 disposed at an angle to the rear face 71. Plow standards 74 are received between the parallel walls 73 and are held in position by means of threaded elements 75. Right and left hand moldboard plows 76 are fixed to the opposite ends of the standards 74.

Since the plate 62 extends continuously from end to end and is not interrupted by the longitudinal beam 37, the brackets 69 may be placed at any desired intervals along the plate 62 and any desired number of plows and plow standards may be used. Furthermore, disc plows may be substituted for the moldboard plows if desired.

Means are provided for turning the plow carrier 60 with respect to the frame 10 in order to bring either the right-hand or left-hand plows 76 into operative position. As shown in the drawings, this means includes a double ended hydraulic power cylinder 77 having piston rods 78 and 79 projecting from the opposed ends thereof. A pulley 80 is mounted on the projecting end of each piston rod and a cable passes over these pulleys and around a drum 81 rotatably mounted on the longitudinal beam 37. A torque arm 8 fixed to the drum 81 is detachably connected to the carrier 60 by means of the threaded element 9. As shown in Figure 6, the ends 82 of the cable are fixed relative to a tiltable bracket 83 mounted on the frame 10. Latch operating rods 84 are pivotally connected to this tiltable bracket 83 and serve to operate the carrier latches 85 and 86. This latching system is substantially the same as that described in my copending application Serial No. 318,051, filed October 31, 1952. As shown best in Figure 7, the forward end of the carrier 60 is provided with a boss 87 and threaded elements 88 and 89 are adjustably received within opposite ends of this boss. The latch 86 is adapted to engage the head of the element 89 and the latch 85 is adapted to engage the head of the element 88. The latches 85 and 86 are fixed on shafts 90 mounted in suitable bearings carried on the frame 10. The latch rods 84 operate crank arms 91 on the shafts, as will be readily understood. When the power cylinder projects piston rod 79 and retracts piston rod 78, the plow carrier the latch 86 into engagement with the element 89 on the 60 is turned clockwise, as viewed in Figure 6, to bring the latch 86 into engagement with the element 89 on the carrier. Similarly, when the cylinder 77 projects the piston rod 78 and retracts piston rod 79, the carrier 60 is turned in a counterclockwise direction and latch 85 engages the latching element 88.

A tail wheel assembly is preferably provided at the rearward end of the carrier 60. This tail wheel assembly may take the form shown in my application Serial No. 241,464, filed August 11, 1951, now Patent No. 2,760,420, and entitled Rear Wheel Assembly for Two-Way Plow, or, as shown in the drawings, may be similar to one of the tail wheel assemblies shown in my application Serial No. 318,051, filed October 31, 1952. As shown in the drawings, this tail wheel assembly generally designated 92 includes an arm 93 carrying a tail wheel 94 at its swinging end. This tail wheel 94 rolls on unplowed ground in either position of the carrier 60. A pivot bolt 95 connects the arm to the plate 96 which is fixed to the carrier 60. The arm 93 carries an arcuate segment 97 provided with a plurality of apertures 98. A pair of lugs 99 and 100 are fixed to the arcuate segment 97 in any one of a series of positions. A swinging stop element 101 is pivotally mounted on the plate 96 at 102 and is actuated by means of a link 103. When the swinging stop element 101 is in the position shown in Figure 8, the end surface 104 thereof engages the lug 99 to limit clockwise swinging movement of the arm 93. When the other end 105 of the swinging stop element 101 is projected, the end 105 is adapted to engage the stop element 100. The element 101 thus serves to hold the arm 93 below its pivotal axis when either the right-hand plows or left-hand plows are in ground-engaging position. The link 103 is pivotally connected to the slide block 106 which is mounted between springs 107 on the rod 108. This rod 108 is moved in either direction by means of a power cylinder assembly 109 having hydraulic connections 110 and 111. These hydraulic connections are joined with similar hydraulic connections, not shown, for operating the double ended power cylinder 77 and the tongue swinging and latching cylinder 46. The bracket 112 fixed to the arm 93 is provided with stop shoulders 113 and 114 which engage the plate 96 to limit downward swinging movement of the arm 93 in either of its operative positions.

In the operation of the device shown in Figures 1–9, the desired number of plows 76 are mounted on the plate 62 at the desired spaces. The set screws 31 and the lugs 99 and 100 are adjusted to provide for the proper depth of cut. The hydraulic power cylinders 24 are energized to raise the frame 10, plow 76 and tail wheel assembly 92 clear of the ground. The pin 21 is withdrawn to permit independent movement of the wheel arms 13 and 14.

The device is then towed behind a tractor to the field to be plowed. The carrier 60 is turned to bring the right-hand or left-hand plows into position and the cylinders 24 are then de-energized to allow the plows to rest on the ground. Forward motion of the tractor then causes the lowermost plows to produce furrows. The tail wheel 94 rolls on unplowed ground. When the far end of the field is reached, the cylinders 24 are energized to lower the wheel arms 13 and 14 and thus raise the frame, plows and tail wheel assembly clear of the ground. The power cylinders 46, 77 and 109 are energized, thereby swinging the tongue and latching it, turning the carrier and latching it and swinging the stop element 101 of the tail wheel assembly 92. One of the side wheels 11 or 12 then rolls in the furrow previously formed with the other side wheel rolling on unplowed ground. The tail wheel 94 continues to roll on unplowed ground. The cylinders 24 are de-energized to allow the plows to enter the ground as the tractor pulls the device forward. The right-hand and left-hand plows are thus used alternately as the plow proceeds back and forth in the field.

Figure 11:
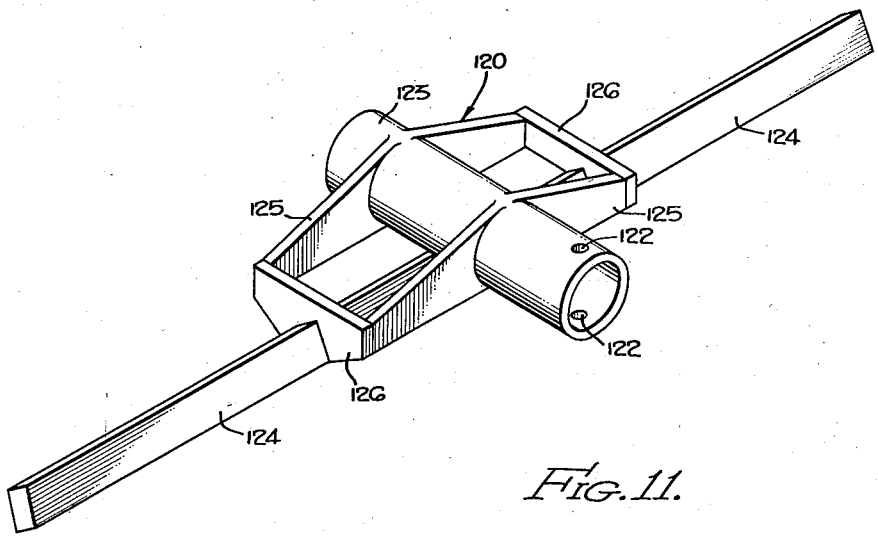
Figure 11 is a perspective view of the tool head shown in Figure 10.

In a modified form of my invention shown in Figures 10 and 11, the plow frame, wheels and tongue shifting mechanism are substantially the same as that previously described. The carrier 60 is removed, however, and the carrier or tool head 120 is substituted therefor. This is accomplished by removing the thrust collar 64, pin 65 and the threaded element 9, and then telescopically separating the carrier 60 and beam 37. The carrier 120 is installed in an obvious manner. A pin 121 extends through aligned apertures 122 in the tubular portion 123 and through aligned apertures in the longitudinal beam 37. The carrier 120 is thus held against turning movement relative to the longitudinal beam 37. The carrier 120 is provided with a transverse bar 124 which is fixed relative to the tubular portion 123 and braced by means of the parts 125 and 126. The bar is preferably square in cross section with its corners projecting up and down. Earth-working tools of various types may be mounted at any desired intervals along this bar 124, as will be readily understood.

In the operation of the device shown in Figures 10 and 11, the pin 21 is installed to insure simultaneous movement of the wheel arms 13 and 14. Furthermore, a pin, not shown, may be inserted in the aligned openings 127 (see Figure 2) to hold the tongue 38 in a central position. The hydraulic cylinders 24 are employed for raising and lowering the wheel arms and thereby raising and lowering the ground-engaging implements carried on the cross bar 124.

Having fully described my invention, it is to be understood that I do not wish to be limited to the details herein set forth but my invention is of the full scope of the appended claims.

I claim:

1. In a two-way plow, the combination of: a frame having a longitudinally extending beam projecting rearwardly therefrom; a carrier mounted on the rearwardly projecting portion of said beam for rotation about the axis thereof, said carrier including a plate fixed to and defining a straight side edge of said carrier extending continuously for substantially the entire length of said carrier, said plate extending obliquely to the axis of said beam and intersecting said axis rearwardly of the projecting end of said beam so that the rearward surface of said plate is unobstructed from end to end and said plate being provided with a series of apertures extending along the length thereof; a plurality of brackets; fastening elements passing through selected ones of said apertures for securing said brackets to said plate at any desired positions along the length thereof; a plow standard secured to each bracket and having right- and left-hand ground engaging tools at opposite ends thereof; and means on the frame for rotating said carrier about said axis.

2. In an agricultural implement, the combination of: a frame having a longitudinally extending beam projecting rearwardly therefrom; a carrier mounted on the rearwardly projecting portion of said beam for rotation about the axis thereof, said carrier comprising a flat plate having a straight edge extending substantially the entire length of the carrier, said straight edge extending obliquely to the axis of said beam from a point located forwardly of the projecting end of said beam to a point located rearwardly thereof and intersecting the axis of said beam rearwardly of its end and a second plate secured at a right angle to said first plate along said straight edge; means for mounting a plurality of ground-engaging tools on said second plate; and means for rotating said carrier about said axis.

3. In an agricultural implement, the combination of: a frame having a longitudinally extending beam projecting rearwardly therefrom; a carrier mounted on the rearwardly projecting portion of said beam for rotation about the axis thereof, said carrier comprising a tubular section receiving the projecting portion of said beam, a flat plate secured to said tubular section with the axis of said beam lying in the plane of said plate, said plate having a straight edge extending substantially the entire length of the carrier, said straight edge extending obliquely to the axis of said beam from a point located forwardly of the projecting end of said beam to a point located rearwardly thereof and intersecting the axis of said beam rearwardly of its end and a second plate secured at a right angle to said first plate along said straight edge; means for mounting a plurality of ground-engaging tools on said second plate; a thrust collar removably secured to said beam adjacent its rearward end and engaging said tubular section of said carrier; and means for rotating said carrier about said axis.

4. The agricultural implement of claim 3 in which said second plate is provided with a series of apertures extending along the length thereof and the means for mounting said ground-engaging tools are secured in any desired position along the length of said second plate by fastening elements passing through selected ones of said apertures.

References Cited in the file of this patent

UNITED STATES PATENTS

| 1,500,367 | Caughey | July 8, 1924 |
| 2,426,548 | Capon et al. | Aug. 26, 1947 |
| 2,591,711 | Moore | Apr. 8, 1952 |
| 2,625,090 | Pursche | Jan. 13, 1953 |

FOREIGN PATENTS

| 447,047 | Italy | Apr. 1, 1949 |